United States Patent [19]

Weihrich et al.

[11] Patent Number: 5,036,265

[45] Date of Patent: Jul. 30, 1991

[54] METHOD AND DEVICE FOR ELIMINATING THE EFFECT OF PERIODIC DISTURBANCE VARIABLE HAVING A KNOWN, VARIABLE FREQUENCY

[75] Inventors: Georg Weihrich, Uttenreuth; Dietrich Wohld, Bräuningshof; Martin Niemann; Clemens Jungkunz, both of Erlangen, all of Fed. Rep. of Germany

[73] Assignee: Siemens Aktiengesellschaft, Berlin & Munich, Fed. Rep. of Germany

[21] Appl. No.: 549,358

[22] Filed: Jul. 6, 1990

[30] Foreign Application Priority Data

Jul. 10, 1989 [EP] European Pat. Off. ........ 89112580.9

[51] Int. Cl.$^5$ .................. G05D 23/275; G05B 13/04
[52] U.S. Cl. ................................ 318/618; 318/632; 318/648; 318/640; 364/149; 364/160; 364/472
[58] Field of Search ................. 318/500–640, 318/648; 364/149, 160–169, 472, 469

[56] References Cited

U.S. PATENT DOCUMENTS

| | | | |
|---|---|---|---|
| 4,500,823 | 2/1985 | Walrath | 318/632 |
| 4,791,548 | 12/1988 | Yoshikawa et al. | 318/561 |
| 4,937,512 | 6/1990 | Takagi | 318/621 |

Primary Examiner—Paul Ip
Attorney, Agent, or Firm—Kenyon & Kenyon

[57] ABSTRACT

A signal which is dependent solely on the disturbance variable is selected by means of a filter and fed to a disturbance detector. This disturbance detector simulates the steady and alternating component (sine component) of the selected signal, as well as a signal (cosine component) phase-leading by 90° with the latter signal. The correction signal required to exactly compensate for the disturbance variable is determined from the sine and cosine component of the periodic disturbance signal component by means of frequency-controlled function generators and a complex phasor calculation.

20 Claims, 5 Drawing Sheets

METHOD AND DEVICE FOR ELIMINATING THE EFFECT OF PERIODIC DISTURBANCE VARIABLE HAVING A KNOWN, VARIABLE FREQUENCY

BACKGROUND OF THE INVENTION

This invention relates to a method and device for eliminating the effect of periodic disturbance variables having a known, variable frequency in general and more particularly, to a method and device for eliminating the effect of periodic disturbance variables having a known, variable frequency affecting control loops between the controlled system and the final controlling element.

These types of frequency-variable disturbances originate in the case of driving mechanisms, for example, from torque ripple factors proportional to rotational speed and result from design-dependent flux asymmetries in the machine, or periodic bearing load content caused by a rotating out-of-balance force in electromagnetically supported rotors.

German Patent 26 58 692 discloses compensating for the effect of such an out-of-balance force, in the case of a magnetic rotor bearing arrangement, by means of a control loop in a transformed coordinate system, which is fixed relative to the rotor. With this method the effect of the out-of-balance force in the effective circuit across the controlled system is eliminated by the controller. This means that the changes in position produced by the periodic out-of-balance force must first pass through the closed loop before they can be eliminated by the position controller. Only moderately fast frequency variations in the disturbance variable can be effectively dealt with using this method.

In view of the prior art, there is a need for a method and device to eliminate disturbance variables occurring in control loops with a wider range of frequency variation.

SUMMARY OF THE INVENTION

According to the present invention, this task is accomplished by a method of parallel elimination of disturbance variables, which is operative without a feedback-control-effective circuit across the controlled system and with which one is able to react faster, particularly in the case of frequency variations in the disturbance variable. More specifically this method and device eliminate the effects of periodic disturbance variables having a known, variable frequency, affecting control loops between a final controlling element and a controlled system. This method consists of obtaining a first signal from a first splitoff point before a point of application of the disturbance variable and then obtaining a second signal at a second splitoff point after the point of application of the disturbance variable. Next one feeds the first and second signals to a mixing element and then selects a selected signal from the mixing element which depends solely upon the disturbance variable. Then using frequency function generators to generate real and imaginary frequency dependent parts of a dimensioned complex correction frequency operation in a correcting element, one amplitude-weights at least a fundamental wave component of the selected signal and a signal that is 90° phase leading the selected signal in the correcting element. Next one sums the amplitude-weighted fundamental wave component and the phase-leading signal in the correcting element to obtain a summed signal and then applies the summed signal either to compensate for disturbance variables before the first splitoff point, or to blank out disturbance variables after the second splitoff point.

In the present invention a signal is selected which is solely dependent on the disturbance variable and then the correction signal required for disturbance feedforward control is formed from the selected signal, by means of a complex phaser calculation. An important advantage which results with the invention is that it functions completely independently of the control loop used at the time; that is it can easily be added to already existing control loops, such that a feedback control can be dimensioned and established independently of the disturbance variable elimination according to the invention.

DETAILED DESCRIPTION

Figure 1:
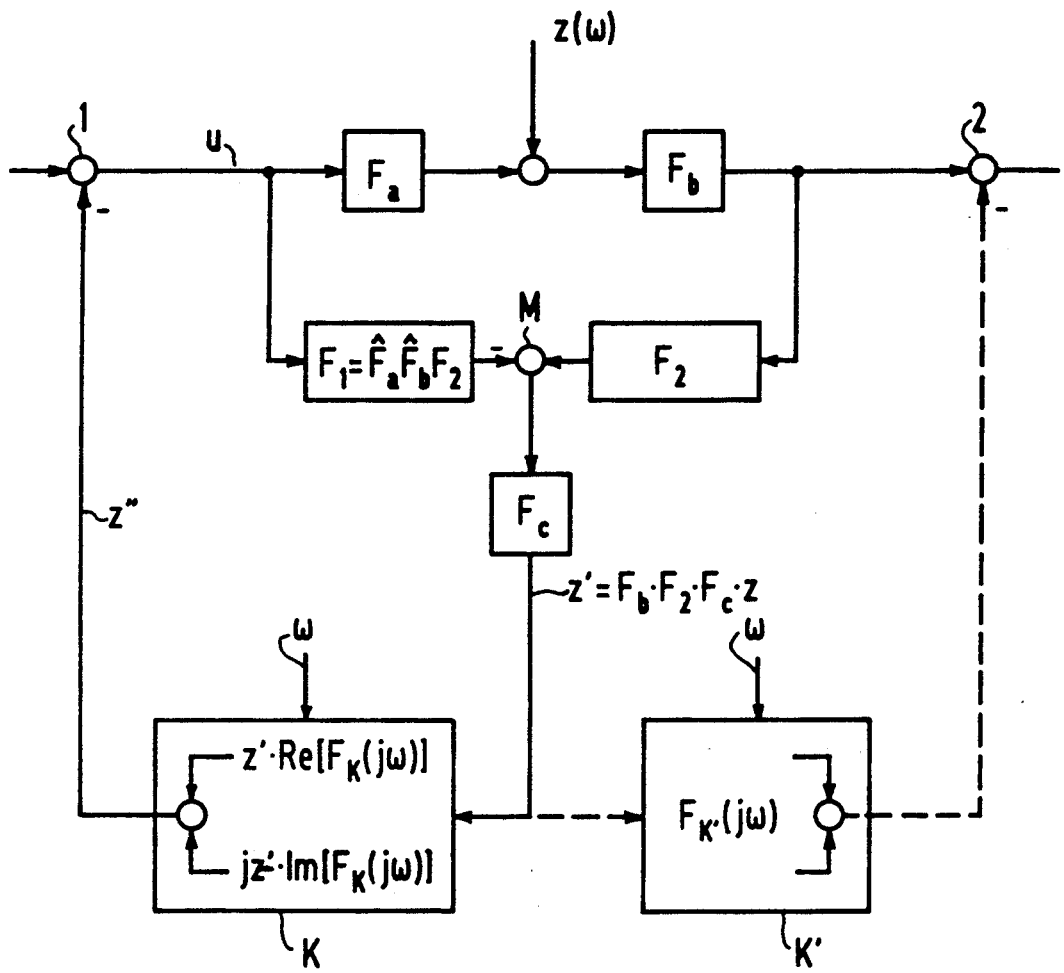
FIG. 1 is a block diagram of the method according to the invention.

In the block diagram of FIG. 1, which clarifies the general principle of the method according to the invention, a periodic disturbance variable $z=z(\omega)$ with a known angular frequency $\omega$ occurs between two transfer elements, which should have the general transfer functions $F_a$ and $F_b$. In the following, the transfer functions (i.e. functions of the Laplace operator s) are uniformly denoted by F, and values and signals, indicated under a "^" are understood to be those with which originally existing variables, and signals respectively, are best simulated. To select the disturbance variable z, the input variable of the transfer element with transfer function $F_1$ and the output variable of the transfer element with transfer function $F_b$ are supplied via two further transfer elements with transfer functions $F_1$ and $F_2$ to a mixing element M. The transfer function $F_2$ can be any realizable transfer function required for the particular application. To ensure that only a signal which is solely dependent upon the disturbance variable z appears at the output of the mixing element M, one must compensate for the component of the signal resulting from passing the signal u through transfer elements with transfer functions $F_a$, $F_b$, and $F_2$. This is achieved by using the transfer element with transfer function $F_1$, which is calculated to be the product of the transfer functions $\hat{F}_a$, $\hat{F}_b$ and $F_2$. The output signal of the transfer element with the transfer function $F_1$ is supplied to the mixing element M, resulting in the difference between the output of the transfer element with transfer function $F_2$ and the output of the transfer element with transfer function $F_1.\hat{F}_a$ and $\hat{F}_b$ thereby signify simulations resulting from modeling of the actual existing transfer functions $F_a$ and $F_b$. In this manner, the output signal of the mixing element M is possibly passed through another transfer element with transfer function $F_c$, resulting in a signal $z'$ which is solely dependent upon the disturbance variable z. With the assumption that $\hat{F}_a = F_a$ and $\hat{F}_b = F_b$, the equation applies for $z'$ becomes $$z' = F_b \cdot F_2 \cdot F_c \cdot z.$$

For the case that transfer functions $F_a$ and $F_b$ have unstable poles or poles which are too slow in their response, it is advantageous to realize these unwanted poles as zeros in the transfer function $F_2$, so that they cancel out the unwanted poles, which then need not be realized in $F_1$. Incidentally, the transfer functions $F_2$ and $F_c$ are to be selected so that, on the one hand, the selected variable $z'$ will build up as quickly as possible, even in the case of possible parameter inaccuracies and, on the other hand, so that measurement disturbances of $z'$ will be avoided.

To acquire a signal from the selected signal $z'$, which after its addition in the summing point 1, compensates for the disturbance variable z, a further transfer element must be provided for the selected variable $z'$. This transfer element should have the transfer function:

$$F_K = \frac{1}{F_1 \cdot F_c} = \frac{1}{\hat{F}_a \cdot \hat{F}_b \cdot F_2 \cdot F_c}$$

Considering the fact that each of the individual transfer functions indicated in the denominator of $F_k$ can be realized, that is that the power of their numerator is at least one degree lower than the power of their denominator, such a desired transfer function ($F_k$), however, would not be realizable with customary components, since the power of its numerator polynomial would be greater than the power of its denominator polynomial.

In view of the fact that both the disturbance variable z as well the selected signal $z'$ are periodic, sinusoidal variables, whose frequency is known and is thus available, it was recognized that it is nevertheless possible to realize the desired response characteristic for the actual frequency. This is possible because the real and imaginary parts of the desired transfer function are made available as a function of the frequency $\omega$. This means that they are either calculated or stored, readily retrievable in a memory, and at least one signal corresponding to the fundamental component of the selected signal $z'$, and another signal phase-leading by 90° the selected signal $z'$ are consequently amplitude-weighted, and these two amplitude-weighted signals are then added. The complex frequency operation results thereby in a well known way out of the transfer function, when, in the latter, one replaces the Laplace operator s by the complex frequency $j\omega$. The selected signal $z'$ is then subjected accordingly to these operations in the transfer block denoted by K, that is from the sinusoidally proceeding signal $z'$, a signal $jz'$, which is phase-leading by 90°, is formed. If the signal $z'$, for example, were of the form $z' = z'_{max} \cdot \sin\omega t$, then according to the rules of the complex phasor calculation, a signal leading signal $z'$ by 90° would have the form $$z' \cdot e^{j \cdot 90} = j \cdot z' = z'_{max} \cdot \cos\omega t.$$

The real and imaginary part of the complex correction frequency operation $$F_K(j\omega) = \frac{1}{F_a(j\omega) \cdot F_b(j\omega) \cdot F_2(j\omega) \cdot F_c(j\omega)}$$

are determined according to the actual value of the frequency and multiplied by the signals $z'$ and $j \cdot z'$, respectively. The result lies in the output variable $z''$ of the correction device K, with which the active disturbance variable $z(\omega)$ can be exactly compensated for at its point of application through subtraction at the summing point 1.

If the selected signal $z'$ is to be subtracted at the summing point 2, not in a manner to compensate for disturbance variables, but rather in a manner to blank out disturbance variables—for example to gain a feedback control actual value that is free of disturbance variables—then this selected signal $z'$ is fed to a correction device designated by K', which, analogously to the way described above, realizes the complex correction frequency operation $$F_{K'}(j\omega) = \frac{1}{F_2(j\omega) \cdot F_c(j\omega)}$$

in a frequency-selective manner.

Of considerable importance for the accuracy of the disturbance variable compensation is that in the signal loop, which is for the actual frequency of the disturbance to be compensated for and which contains the summing point 1, the transfer elements with the transfer functions $F_1$ and $F_c$, as well as the correction device K, there exists a closed-loop gain from value 1 and a phase rotation (i.e displacement) from 0. By this means, one is able to offset parameter inaccuracies (e.g. simulation errors of the transfer functions $F_a$ and $F_b$).

Figure 2:
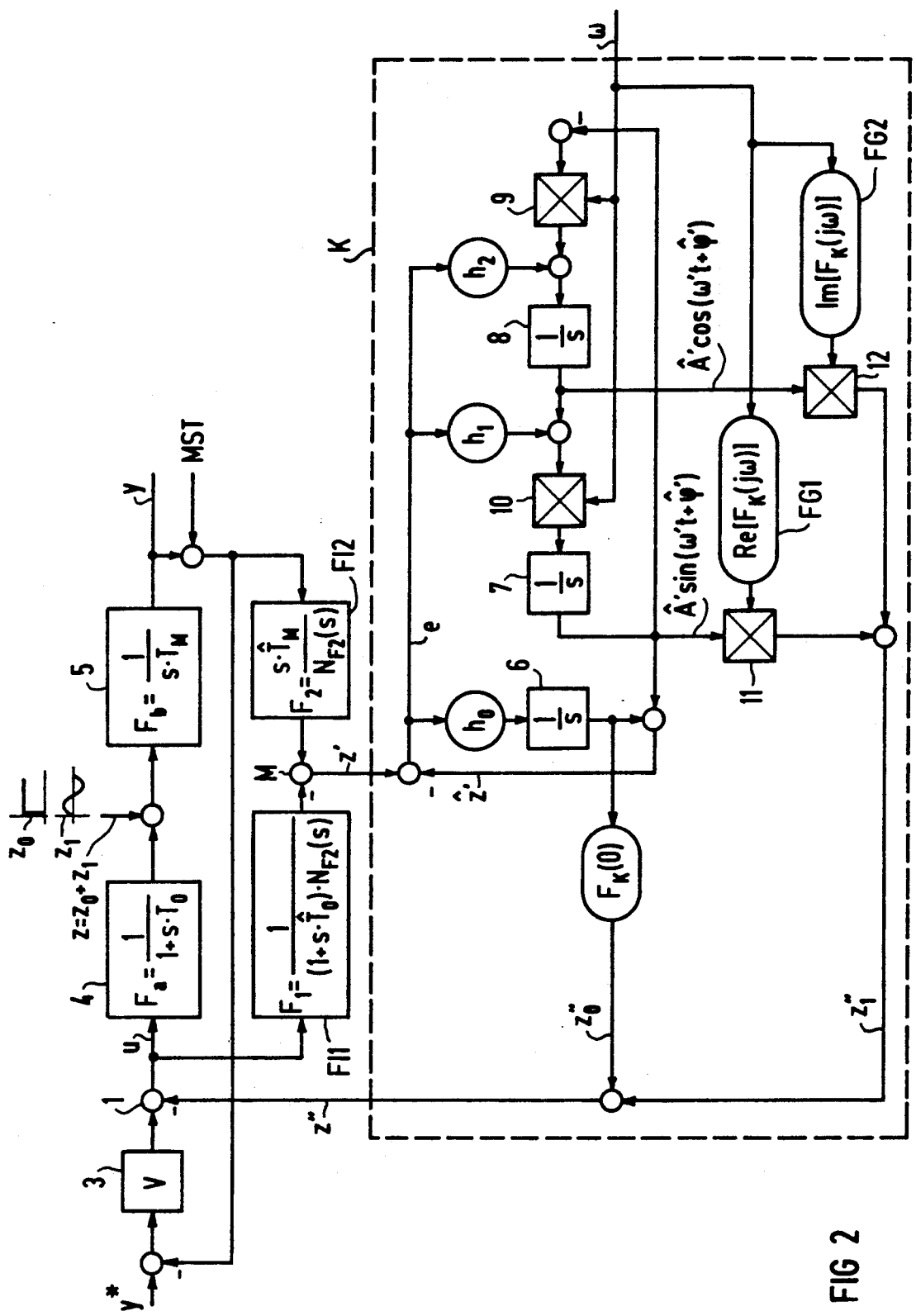
FIG. 2 illustrates the application of the invention in the case of a closed-loop speed control with the use of an disturbance-variable detector.

FIG. 2 depicts the application of the method according to the invention based on the example of a closed-loop speed control. The output variable of the speed controlling device 3 designed as a proportional amplifier with the gain V acts on the final controlling element 4, which features the transfer function $F_a = 1/(1 + sT_o)$ of a time-delay element of the first order with the time constant $T_o$, the time-delay element in turn loads a driving motor, which is designated by 5 and has the response characteristic $F_b = 1/s \cdot T_M$. The controlled variable y, which consists of the rotational frequency of the motor 5 and which is fed back to the input of the speed controlling device 3, shall still be superimposed by a measured-value disturbance designated by MST. The disturbance variable z occurs between the final controlling element 4 and the driving motor 5. As indicated in FIG. 2, the disturbance variable z is composed of a steady component $z_o$ and of a periodic component $z_1$, which is frequency dependent upon the driving speed y at the time. The disturbance variable z can therefore be generally described as follows $$z = z_o + Z_1 = Z_o + A \cdot \sin(\omega t + \rho)$$

whereby A signifies the amplitude and $\omega t + \rho$ the phase of the periodic disturbance ($\omega$ = cyclic frequency).

The first step of the method according to the invention requires selecting a signal $z'$, which is dependent solely on the disturbance variable z. Therefore, the input variable u of the final controlling element 4 is supplied in a subtractive process via a first filter FI1 to a mixing element, and the output variable of the controlled system consisting of the driving motor 5 is supplied in an additive process to this mixing element M via a second filter FI2. As already mentioned in connection with the principal mode of operation according to FIG. 1, both filters FI1 and FI2 must be dimensioned so that the input variable u of the final controlling element 4 at the output of the mixing element M is not able to produce an effect, so that only a signal z' dependent upon the disturbance variable z appears there. Therefore, the transfer function $F_1$ of the first filter FI1 must be calculated to be equal to the product of the transfer function $F_2$ of the second filter FI2 and of the transfer function $F_a \cdot F_b$ from the input variable u up to the output variable of the controlled system 5. One can thereby freely select the transfer function $F_2$ of the filter FI1 and can adapt this function to the specific requirements.

As already mentioned, it is advantageous to compensate for the denominator of the transfer function of the controlled system 5 by using the numerator of the transfer function $F_2$. Therefore, the numerator of the transfer function $F_2$ retains the form $s \cdot T_M$, whereby the motor time constant $T_M$ of the driving motor 5 is supposed to be simulated with the coefficient $T_M$. In order to realize the transfer function $F_2$, it is necessary for the power of its denominator polynomial $N_{F2}(s)$ to be at least one degree higher than the power of its numerator. In the depicted example, therefore, $$N_{F2}(s) = a_0 + a_1 s + s^2,$$

can be applied as the denominator polynomial $N_{F2}(s)$ of the transfer function $F_2$, whereby the coefficients $a_0$ and $a_1$ can be calculated in such a way as to ensure that the measured value disturbance MST is sufficiently suppressed in the frequency range of interest. The transfer function $F_1$ of the filter FI1 for $$F_1 = 1/((1 + sT_0) \cdot N_{F2}(s))$$

results when the response characteristic $$F_2 = s T_M / N_{F2}(s)$$

of the filter FI2 is determined. Also, the transfer function $z'/z = 1/N_{F2}(s)$ exists when there is an adequate simulation of the motor time constant $T_M$ between the disturbance variable z and the signal z' selected at the output of the mixing element M.

When the transfer function $$F_K = \frac{1}{F_1} = (1 + sT0) \cdot N_{F2}(s)$$

is provided between the signal z' selected at the output of the mixing element M and the signal z'' supplied at the summing point 1, then the disturbance variable z occurring at any time can be exactly compensated for at its point of application. For this purpose, the correcting element K is used. It makes available the necessary complex correction frequency operation $F_k(j\omega)$.

In the depicted example, the correcting element K is comprised of disturbance detector containing three integrators 6, 7 and 8 and two function generators designated with FG1 and FG2, with which one can undertake an amplitude weighing of the sine-shaped, and cosine-shaped output signals of the disturbance detector to realize the correction frequency operation $F_k$ in a frequency-selective manner. The selective variable z' supplied to the correcting element K is to be completely simulated, in other words both with respect to its steady component $z_0$, as well as with respect to its alternating component $z_1$, by means of the disturbance detector comprised of the integrators 6 to 8. This simulated signal is designated with z'. The integrator 6 simulating the steady component of the selected signal z' as well as the two other integrators 7 and 8, which are arranged in series and are fed back to an oscillation element, are compensated for by the error signal e in a generally standard way, that is the difference between the supplied signal z' and the simulated signal z' is corrected according to the coefficients $h_0$, $h_1$ and $h_2$, so that there is agreement between the signal z' and its simulation z' and so that the error signal e becomes zero. The frequency of the oscillation element consisting of the integrators 7 and 8 is determined by the variable $\omega$ supplied multiplicatively to the integrators 7 and 8. This variable $\omega$ can be selected to be either proportional to the actual value of the controlled variable, namely the rotational frequency y of the motor 5, or proportional to the rotational frequency nominal value y*. The correcting coefficient $h_1$ acts in a frequency-weighted manner on the input of the second integrator 7. When, with reference to calculating the correcting coefficients $h_0$, $h_1$ and $h_2$, the relation $h_2 = j_1 \cdot h_0$ is maintained, then with $h_0$, an detector pole is able to be established at $s = -h_0$. The feedback coefficient $h_1$ determines the attenuation $D = h_1/2$ of the detector. This is constant for all frequencies in the case of the variant of the disturbance detector depicted in FIG. 2, as a result of the frequency weighing of the feedback coefficient $h_1$ for all frequencies, whereby this variant also offers the advantage that the feedback coefficients $h_0$ and $h_1$ can be established as constant values which are able to be selected arbitrarily, independently of the disturbance frequency $\omega$.

A sine-shaped signal $\sin(\omega t + \rho)$, which simulates the alternating component of the selected variable z', develops at the output of the integrator 7. When added to the steady component of the selected signal z' simulated by the integrator 6, this sine-shaped signal $A' \sin(\omega t + \rho)$ results in the variable z' simulating this signal. At the output of the integrator 8 arranged in front of the integrator 7, a signal of the form $A' \cos(\omega t + \rho)$ develops, which is phase-leading with the alternating component of the selected variable z' by 90°. To realize the correction frequency operation $F_k(j\omega)$, the output signals of the integrators 7 and 8 are then amplitude-weighted with the output signals from the function generators FG1 and FG2 controlled with the frequency $\omega$. This is achieved with the application of two multipliers 11 and 12. In the example of FIG. 2, the function generator FG1 realizes, in the case of the underlying denominator polynomial of $N_{F2}(s) = a_0 + a_1 s + s^2$, whereby $s = j\omega$, its real part, that is the function $$Re\ F_k(j\omega) = a_0 - (1 + a_1 T_0) \cdot \omega^2$$

and the function generator FG2 realizes its imaginary part, that is the function $$IM\ F_k(j\omega) = (a_0 \cdot T_0 + a_1) - T_0 \cdot \omega^3$$

In the case of the function generators FG1 and FG2, it can be a question of analog computing circuits; in the current state of the art, these can be realized with commercial digital-signal processors, for example the signal processor TMS320xx manufactured by Texas Instruments. The output signals of the multipliers 11 and 12 are added; then a corresponding steady component $z_o''$ derived from the output signal of the integrator 6 is also added to the thus developing composite signal $z_1''$, which corresponds to the alternating component of the selected signal $z'$ corrected in the frequency operation. In this manner then, one obtains the signal $z''$ required for the disturbance feedforward control. The factor $F_k(0)$, with which the output variable of the integrator 6 is weighted, results then from the value of the correction frequency operation $F_k(j\omega)$ for $\omega=0$ and, in the case of the selected example, would have the value $a_o$.

Figure 3:
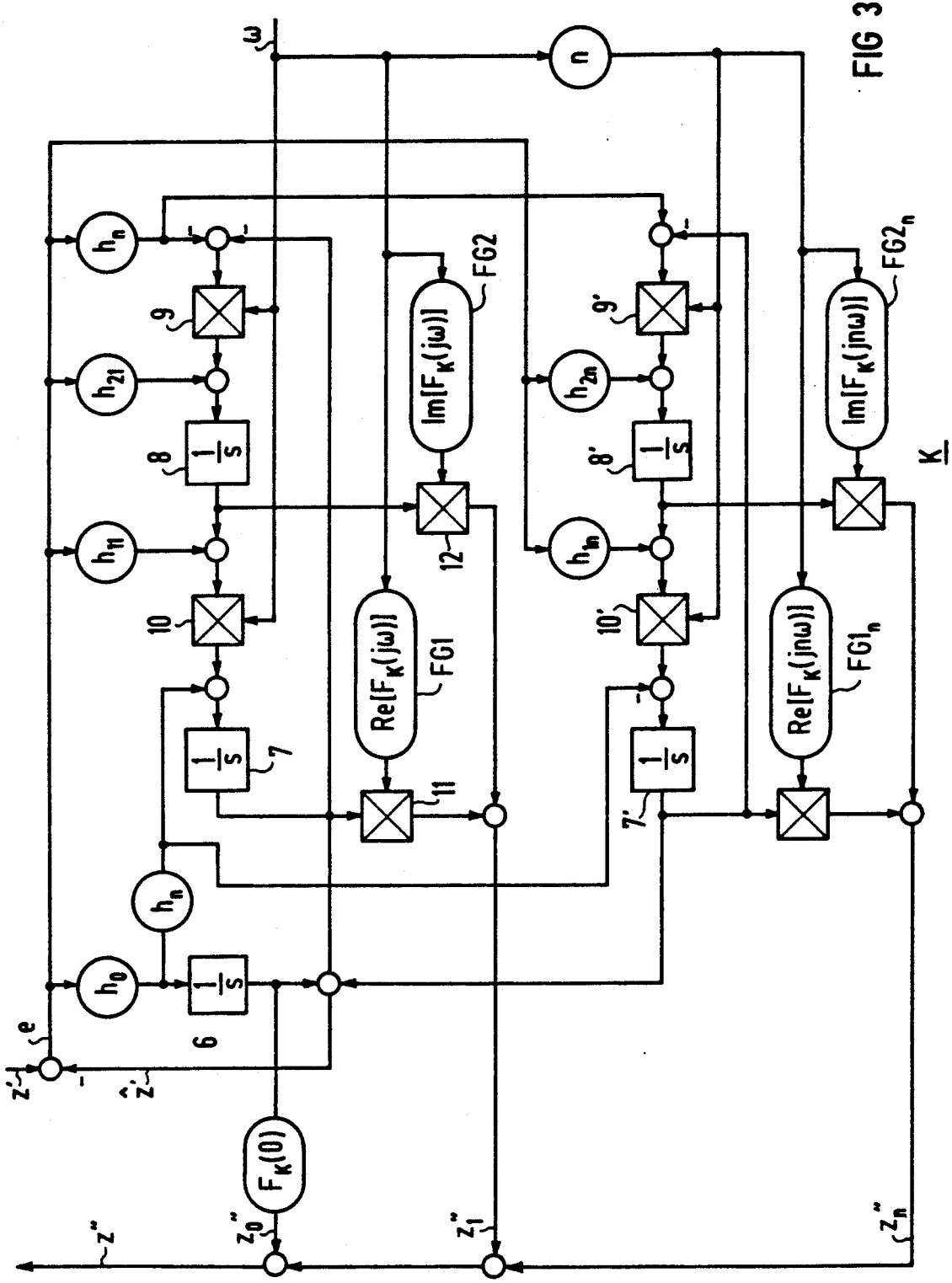
FIG. 3 shows an disturbance-variable detector, with which, apart from the fundamental component, an additional harmonic component of any order can also be simulated.

FIG. 3 depicts a development of the correcting element K, with which in addition to the fundamental component of the selected variable $z'$, another higher harmonic component can also be simulated out of its frequency spectrum and be made available, corrected accordingly. The disturbance detector is expanded accordingly by an additional integrator pair $7'$, $8'$, which, in the same way as the original integrator pair 7, 8, is compensated for by the error signal e and, instead of with the frequency $\omega$, is pre-controlled with the n-times frequency $n\cdot\omega$. The correcting coefficients are calculated in a similar fashion; that is $h_{21}=h_{11}\cdot h_o$ and $h_{2n}=h_{1n}\cdot h_o$, whereby the attenuation D of the fundamental component can be established with the value $h_{11}=2D$, and the attenuation $D_n$ provided for the (n−1) harmonic component can be established with the value $h_{1n}=2D_n$. Now, an additional compensating signal, which is proportional to the error signal e by the factor $h_n$, acts on the inputs of all integrators, whereby this signal becomes effective in a frequency-weighted manner in the case of the two integrators 8, 8' simulating the phase-leading signal and, in the case of the two remaining integrators 7, 7' becomes effective in a frequency-weighted manner with the correcting coefficient $h_o$ of the integrator 6 simulating the steady component. This factor $h_n$ is calculated for the (n-1) harmonic component at $$h_n = \frac{n}{n^2 - 1} \cdot h_{11} \cdot h_{1n} \text{ whereby } n = 2, 3 \ldots$$

The functioning and mode of operation of the two function generators $FG1_n$ and $FG2_n$ are in accordance with the function generators FG1 and FG2. The difference lies only in that in the case of the functions to be formed by them, the variable $n\cdot\omega$ occurs instead of the variables $\omega$, since of course now the real and imaginary part of the complex frequency operation $F_k(jn\cdot\omega)$ are to be made available.

Figure 4:
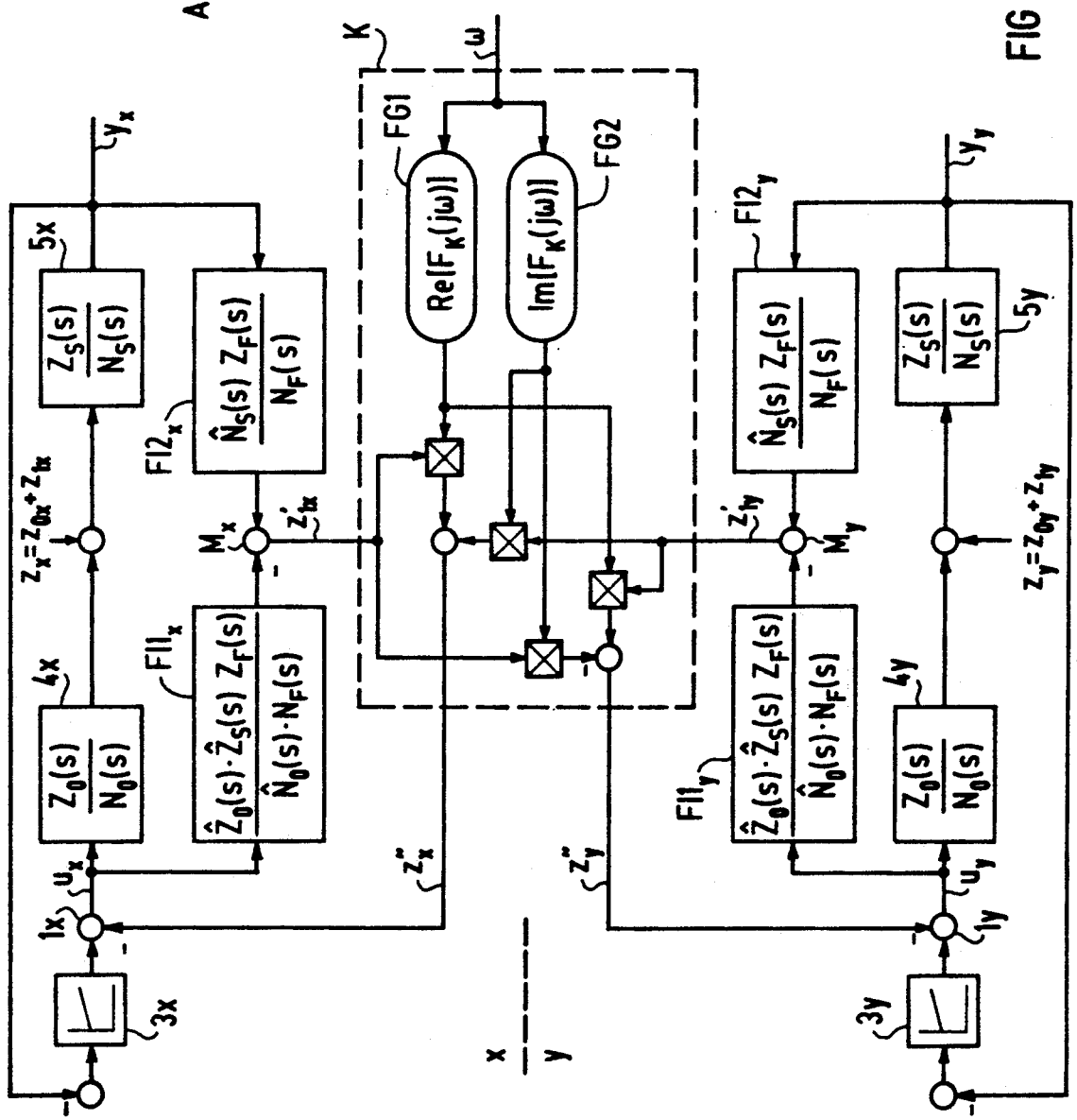
FIG. 4 shows the application of the invention in the case of an electromagnetically supported rotor.

FIG. 4 illustrates an application of the method according to the invention for the control loop of an out-of-balance encumbered, electromagnetically supported rotor in two axes x and y, which are perpendicular to each other. For the feedback control, a control loop consisting of the position controllers $3x$ and $3y$, the final controlling elements $4x$ and $4y$, and the controlled systems $5x$, and $5y$, is provided along each axis. Thus, in principle, each axis is provided with the same configuration as FIG. 2 and, accordingly, the periodic disturbance can be selected at $z_{1x}$ and $z_{1y}$ in two axes situated at right angles to each other in the mixing elements $M_x$ and $M_y$. The dimensioning of the filters $FI1_x$ and $FI2_x$ and $FI1_y$ and $FI2_y$ takes place in the manner described previously. Particularly in the case of the configuration according to FIG. 4, the denominator polynomial $N_s(s)$ of the prevailing controlled systems $5x$ and $5y$, are compensated for with the numerator polynomial of the transfer functions of the filters $FI2_x$ and $FI2_y$. In addition to this, the denominators of these transfer functions with the term $Z_F(s)$ contain a component, with which the steady component of the disturbance component $z_{ox}$ and $z_{oy}$, occurring in the x- and in the y-direction respectively, is suppressed. These steady components can either be corrected with the position controllers $3x$ and $3y$, developed as PI-controllers in the example of FIG. 4, or they can be compensated for in the case of a state control by the detector and, from there, be applied in a compensating manner.

Figure 5:
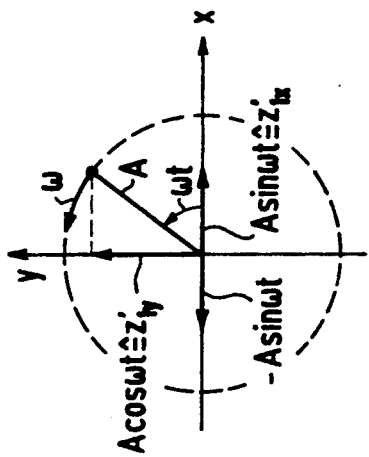
FIG. 5 is a diagram for depicting orthogonal, out-of-balance components in the case of an electromagnetically supported rotor.

As FIG. 5 should clarify, the cause of the interfering variable is an imbalance rotating with the cyclic frequency $\omega$ and, in the two axes x and y, which are perpendicular to each other, their components $z_{1x}$ and $z_{1y}$ respectively (which are perpendicular to each other) are determined using measuring technology, and these components are selected at the signals $z'_{1x}$ and $z'_{1y}$, respectively. Thus the fundamental components required for the frequency operation correction according to the invention, together with the signals which are phase leading by 90° these fundamental components, are already available, then the mixing element $M_y$, and $M_x$, assigned to the other axis supplies the oscillation component which, in addition, is phase leading by 90°, the fundamental component at the output of the one mixing element $M_x$, and $M_y$ respectively. Therefore, the disturbance detector used in FIG. 2 is not required, and the output signals of the mixing elements $M_x$ and $M_y$ can be received directly by the two function generators FG1 and FG2 respectively, in the manner indicated in FIG. 4 and, when added accordingly, can form the added signals $z_x$ and $z_y$, respectively. In the case of the example depicted in FIG. 4, the real and the imaginary part of the complex correction frequency operation $$F_k(j\omega)=N_O(j\omega)\cdot N_F(j\omega)/(Z_O(j\omega)\cdot Z_s(j\omega)\cdot Z_F(j\omega))$$

is to be made available by the function generators FG1 and FG2.

If, in the configuration according to FIG. 4, one would like to dispense with keeping the periodic disturbance variable away from the controlled system by periodically activating the final controlling element and, instead, would like to limit oneself—provided that the bearing air gap fluctuations remain within their tolerance—to preventing the reaction of final controlling elements to the disturbance variable, then, deviating from the exemplified embodiment of FIG. 4, the selected signals $z_{1x}$ and $z_{1y}$ would not be made effective in a manner to compensate for disturbance variables in front of the place of application of the disturbance variable, but would rather be made effective in a manner to blank out disturbance variables in the output variable $Y_x$ and $Y_y$, respectively, of the controlled system $5x$ and $5y$, respectively, as corresponds to the version drawn in a dotted line in the block diagram of FIG. 1. The function generators FG1 and FG2 of the correction element K would then have to form the real and imaginary part of the correction frequency operation $$F_k(j\omega)=N_F(j\omega)/(N_s(j\omega)\cdot Z_F(j\omega))$$

With this variant, a so-called "soft support" would be realized in the range of the rotor's rotational frequency, while the version depicted in FIG. 4 represents a "rigid support" for an electromagnetically supported rotor.

Figure 6:
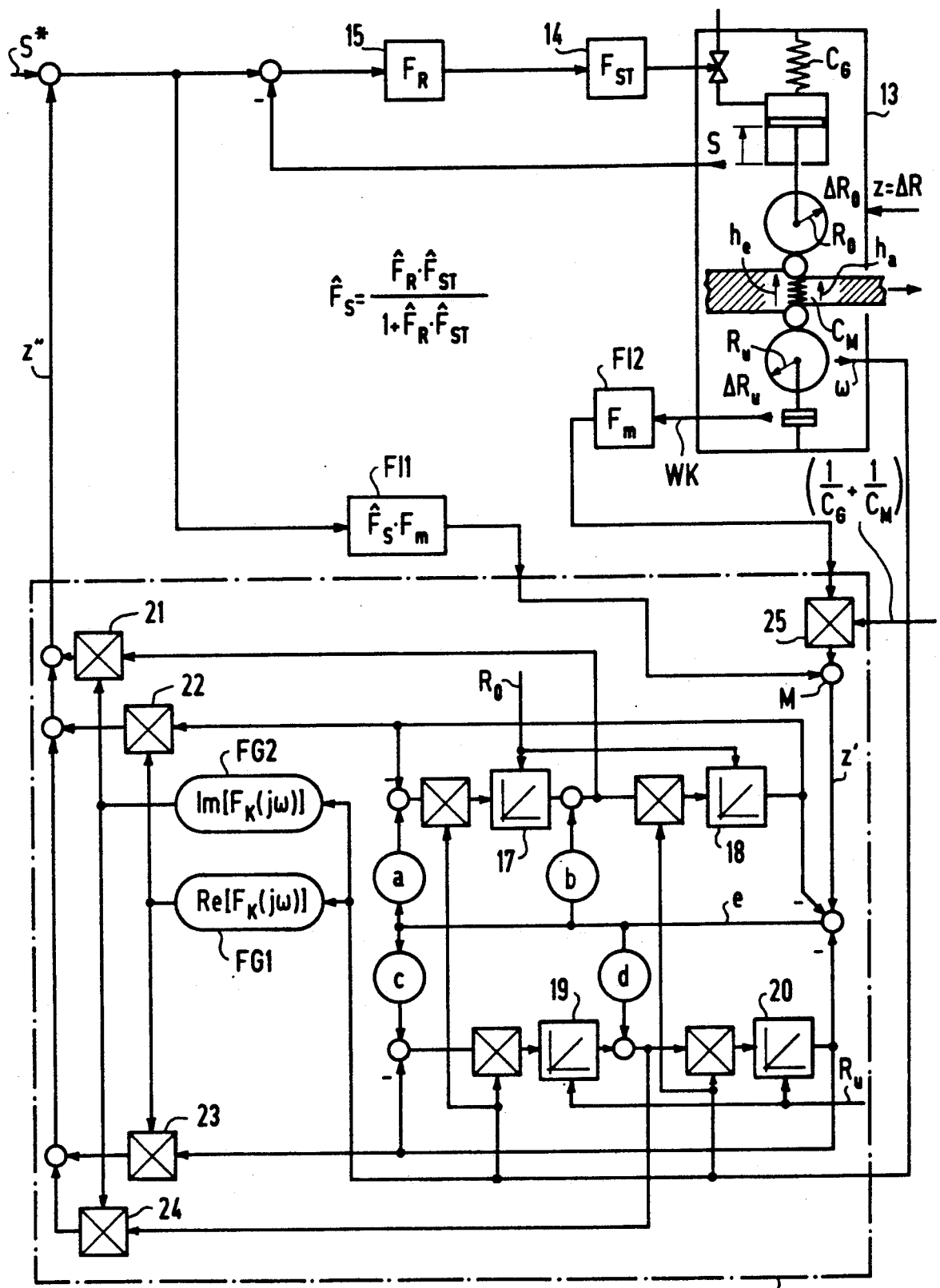
FIG. 6 depicts the application of the invention in the case of the positioning control for starting up a roll stand.

FIG. 6 depicts a position control for the positioning of a schematically depicted roll stand 13. This roll stand 13 is comprised of an upper backing roll with the radius $R_o$, a lower backing roll with the radius $R_u$, two working rolls of smaller diameter, a hydraulic piston which effects the adjustment of the upper backing roll and, belonging to the piston, a hydraulic cylinder, which is supported on the supporting framework. The flexible supporting framework is represented symbolically by a spring with the spring constant $C_G$. The rolled stock, which in the roll nip is assigned an equivalent material spring with the spring constant $C_M$, is rolled by means of the two working rolls from the inflow thickness $h_e$ down to the outflow thickness $h_a$. The eccentricity of the upper and the lower backing roll is caused by the rolls wearing unevenly, by deformations due to thermal stresses and by deviations of the geometric cylinder axes of the rolls from the axes of rotation which arise during operation. They are denoted by $\Delta R_o$ and $R_u$ respectively (i.e as deviations from the ideal backing roll radii $R_o$ and $R_u$, respectively). The sum of the influences of these deviations can be designated by a total roll eccentricity $\Delta R$ and represents a periodically acting disturbance variable z. Measurement transducers are provided for the backing roll rotational frequency $\omega$, usually in the form of a tachodynamo coupled to the driving motor, for the roll force WK exerted by the hydraulic piston and for the roll starting position, which corresponds to the relative position S of the hydraulic piston moving the upper backing roll. 14 denotes a trigger element, by means of which the hydraulic piston is pressurized with pressure oil through a valve. The actuating signal for the trigger element 14 consists in the output signal of a position controller 15, whose nominal value is the signal S*. In the case of such a position control, the European Patent EP 170 016 B1 proposes, inter alia, feeding the measured-value signal S, the measured-value signal corresponding to the roll force WK, and the rotational-frequency measuring signal $\omega$ to a roll-eccentricity compensator, denoted therein by RECO, and to subtract the output signal of this compensator from the measured value signal S. The effect of roll eccentricities can only be adequately compensated for when one can assume that measured values are smoothed to a degree which is small enough and when a dynamic, exceptionally first-rate starting hydraulics is provided.

FIG. 6 depicts the improvement, according to the invention, of the known roll-eccentricity compensator, which lies in precisely eliminating the influence of roll eccentricities for cases where these conditions are not given. Apart from another instance of signals being applied to the input side of the roll-eccentricity compensator, this improvement lies in that the output signals of the integrator pairs 17, 18, and 19, 20, simulating the roll eccentricity $\Delta R$ as a model, are fed respectively to the multipliers 21, 22, 23, 24, and the second inputs of these multipliers are acted upon by frequency-controlled function generators FG1, FG2 for the real and imaginary part of the correction frequency operation. The sum of the output signals of the multipliers is then added to the nominal value S* of the position controller 15.

On the input side, the output signals of two filters FI1 and FI2 are applied to the roll-eccentricity compensator 16. The filter FI2 is a smoothing filter for the measured value of the roll force WK with the transfer function $F_M$. The input variable of the position control loop is carried over the filter FI1 with the transfer function $F_S \cdot F_M$, whereby $F_S = F_R \cdot F_{ST}/(1 + F_R \cdot F_{ST})$ is the simulated transfer function of the position control loop, where $F_R$ and $F_{ST}$ are the simulated transfer functions of the position controller 15, and of the final controlling element 14, respectively. Since the output signal of the filter FI2 is weighted by means of the multiplier 25 with the sum of the inverse values of the supporting-framework spring constant $C_G$ and of the material spring constant $C_M$ and thus the response characteristic of the roll nip is compensated for, the variable z' appears at the output of the mixing element, which variable is dependent solely upon the respective, acting disturbance variable, that is of the eccentricity R. This variable z' is then simulated in a well known manner by the disturbance variable detector consisting of the integrators 17, 18, and 19, 20, and, by means of the function generators FG1 and FG2, as well as of the multipliers 20 to 23, subjected in a frequency-selective manner to the correction frequency operation $$F_K(j\omega) = \frac{1}{F_S(j\omega) \cdot F_M(j\omega)}$$

The output variable z" is then added to the nominal value S* of the position control loop in the manner thereby compensating for the disturbance variable z.

What is claimed is:

1. A method for eliminating effects of periodic disturbance variables having a known, variable frequency, affecting control loops between a final controlling element and a controlled system, said method comprising the steps of:
   a) obtaining a first signal from a first splitoff point before a point of application of the disturbance variable;
   b) obtaining a second signal from a second splitoff point after the point of application of the disturbance variable;
   c) feeding the first and second signals to a mixing element;
   d) selecting a selected signal from the mixing element which is a function only of the disturbance variable;
   e) generating real and imaginary frequency dependent parts of a dimensioned complex correction frequency operation in a correcting element;
   f) amplitude-weighting at least a fundamental wave component of the selected signal and a signal that is 90° phase-leading the selected signal in the correcting element;
   g) summing the amplitude-weighted fundamental wave component and the 90° phase-leading signal in the correcting element to obtain a summed signal; and
   h) applying the summed signal either to compensate for disturbance variables before the first splitoff point, or to blank out disturbance variables after the second splitoff.

2. The method of claim 1, wherein the step of applying the summed signal comprises applying a steady component of the selected signal in a disturbance-variable compensating manner before the first splitoff point.

3. A device for eliminating effects of periodic disturbance variables having a known, variable frequency, affecting control loops between a final controlling element and a controlled system, said device comprising:
  a) a first filter receiving an input variable of the final controlling element;
  b) a second filter receiving an output variable of the controlled system;
  c) a mixing element receiving the outputs of said first filter and said second filter;
  d) a correcting element simulating the sine and cosine components of a fundamental wave component of a selected output signal of said mixing element, said correcting element including:
    (i) a disturbance detector having a first and second integrator arranged in series, said disturbance detector being controlled by said correcting element, and each of said integrators generating output signals;
    (ii) an oscillation element receiving feedback from said first and second integrators;
    (iii) two multipliers receiving the output signals from said first and second integrators, said two multipliers having other inputs;
    (iv) frequency-controlled function generators generating real and imaginary parts of a correction frequency operation and acting upon the other inputs of said two multipliers; and
  e) a summing element receiving the sum of the output signals of said two multipliers for purposes of disturbance feedforward control.

4. The device of claim 3 wherein said first filter has a first transfer function calculated to equal the product of a second transfer function of said second filter and a third transfer function from the input of the final controlling element to the output of the controlled system.

5. The device of claim 4 wherein said disturbance detector comprises a third integrator simulating a steady component of the selected signal selected by said mixing element, wherein the output signal of said third integrator is fed in a disturbance-variable compensating manner to said summing element.

6. A device for eliminating effects of periodic disturbance variables having a known, variable frequency, affecting control loops between a final controlling element and a controlled system for positionally controlling an out-of-balance, loaded, electromagnetically supported rotor in two axes which are perpendicular to each other, said device comprising:
  a) a controller for each axis, each of said controllers having an assigned final controlling element, and each having a measuring device for a controlled variable;
  b) a first filter for each axis each of said first filters having an output and a first transfer function, each of said first filters receiving an input variable from the final controlling element;
  c) a second filter for each axis each of said second filters having an output and a second transfer function, each of said second filters receiving an output variable of the controlled system whereby the first transfer function of said first filter is calculated to equal the product of the second transfer function of said second filter and a third transfer function determined from an input of the final controlling element to an output of the controlled system;
  d) a mixing element assigned to each axis, each of said mixing elements having an output, said mixing elements receiving the outputs of said first and second filters;
  e) two frequency-controlled function generators generating real and imaginary parts of a correction frequency operation;
  f) two multipliers for each axis coupled together to provide an added output signal, each of said multipliers amplitude-weighting the output signal of said mixing element assigned to the first axis and the output second axis with the output signals of said frequency-controlled generators; and
  g) a summing element for each axis, each of said summing elements adding the added output signal in a disturbance-variable compensating manner to the input variable of the final controlling element.

7. A device for eliminating effects of periodic disturbance variables having a known, variable frequency affecting control loops between a final controlling element and a controlled system for a position controller for positioning roll stands, said device comprising:
  a) a roll-eccentricity compensator including a disturbance detector having a first and second integrator and including oscillators having a third and fourth integrator, the integrators being arranged in series and having outputs which are fed back;
  b) a plurality of multipliers having first and second inputs the first input receiving output signals of the first, second, third and fourth integrators; and
  c) frequency-controlled function generators generating real and imaginary parts of a correction frequency operation, said function generators acting upon the second inputs of said multipliers, wherein the sum of the output signals of the multipliers is added to a nominal value of the position controller.

8. The device of claim 4 wherein the second transfer function, having a numerator and a denominator, of said second filter has in the numerator, the denominator of transfer function of the controlled system.

9. The device of claim 5 wherein the second transfer function, having a numerator and a denominator, of said second filter has in the numerator, the denominator of a transfer function of the controlled system.

10. The device of claim 6 wherein the second transfer function, having a numerator and a denominator, of said second filter has in the numerator, the denominator of a transfer function of the controlled system.

11. The device of claim 4 wherein said second filter has a second transfer function suppressing disturbances in measuring an output variable of the controlled system.

12. The device of claim 5 wherein said second filter has a second transfer function suppressing disturbances in measuring an output variable of the controlled system.

13. The device of claim 6 wherein said second filter has a second transfer function suppressing disturbances in measuring an output variable of the controlled system.

14. The device of claim 8 wherein said second filter has a second transfer function suppressing disturbances in measuring an output variable of the controlled system.

15. The device of claim 5 wherein said first, second, and third integrators receive a correcting signal proportional to an error signal of the disturbance variable to correct the error signal, wherein the correcting signal becomes effective in a frequency-weighted manner only in the case of said second integrator simulating a fundamental wave component of the selected signal, and further wherein a correcting coefficient of the first integrator simulating the steady component is equal to a quotient of two other correcting coefficients.

16. The device of claim 15 wherein said disturbance detector further comprises:
   a) a first and second additional integrator pair simulating a harmonic component, together with said corresponding frequency-controlled function generators;
   b) each of said integrators having inputs and receiving an additional correcting signal proportional to the error signal with a factor dependent upon the order of the harmonic component, wherein the additional correcting signal, in the case of the second integrator and second additional integrator each simulating the phase-leading signal, is frequency-weighted and is made effective in a weighted manner, and in the case of the first integrator and the first additional integrator, the additional correcting signal is frequency weighted and becomes effective with the correction coefficient of the first integrator simulating the steady component.

17. The device of claim 4 wherein said function generators comprise a digital signal processor.

18. The device of claim 7 wherein said function generators comprise a digital signal processor.

19. The device of claim 16 wherein said function generators comprise a digital signal processor.

20. The device of claim 4 wherein said function generators comprise a read only memory and said read only memory is addressable by a digitized frequency value and frequency-dependent values of real and imaginary parts of the correction frequency operation are stored in fine steps in said read only memory.

* * * * *